No. 885,535. PATENTED APR. 21, 1908.
S. T. SHERRILL.
HARROW AND CULTIVATING IMPLEMENT.
APPLICATION FILED JULY 31, 1907.
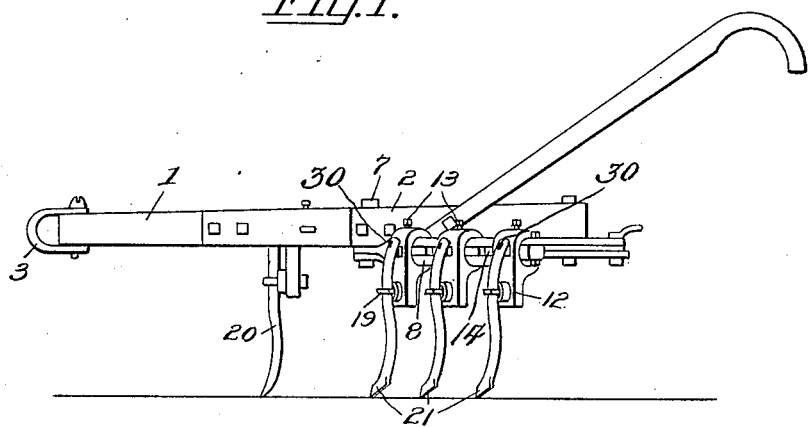
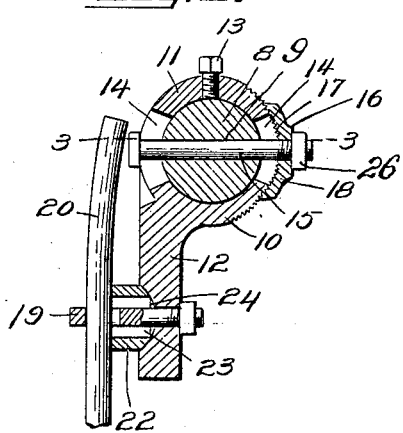
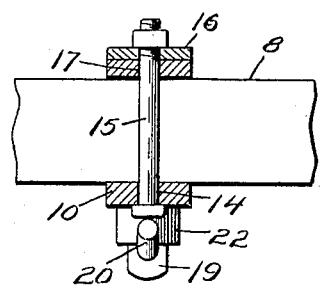
Inventor
Samuel T. Sherrill.
Witnesses
By Victor J. Evans
Attorney

UNITED STATES PATENT OFFICE.

SAMUEL T. SHERRILL, OF MEXIA, TEXAS.

HARROW AND CULTIVATING IMPLEMENT.

No. 885,535.  Specification of Letters Patent.  Patented April 21, 1908.

Application filed July 31, 1907. Serial No. 386,394.

*To all whom it may concern:*

Be it known that I, SAMUEL T. SHERRILL, a citizen of the United States of America, residing at Mexia, in the county of Limestone and State of Texas, have invented new and useful Improvements in Harrows and Cultivating Implements, of which the following is a specification.

This invention relates to harrows and cultivating implements; and it has for its objects to construct a device of this class which may be readily adjusted and adapted to various uses; further objects of the invention being to simplify and improve the construction and operation of the class of agricultural implements to which the invention belongs.

With these and other ends in view which will readily appear as the nature of the invention is better understood, the same consists in the improved construction and novel arrangement and combination of parts which will be hereinafter fully described and particularly pointed out in the claims.

In the accompanying drawings, has been illustrated a simple and preferred form of the invention; it being, however, understood that no limitation is necessarily made to the precise structural details therein exhibited, but that changes, alterations and modifications within the scope of the invention may be resorted to when desired.

In the drawings:—Figure 1 is a side elevation of a harrow made in accordance with my invention. Fig. 2 is a vertical sectional view, enlarged, taken through one of the harrow bars, one of the cuffs or holders and related parts. Fig. 3 is a horizontal sectional view taken on the plane indicated by the line 3—3 in Fig. 2. Fig. 4 is a perspective detail view showing the collar detached.

Corresponding parts in the several figures are denoted by like characters of reference.

The beam of the improved implement is composed of front and rear parts or sections 1 and 2. The front section 1 of the beam is provided with a clevis 3 for the attachment of the draft, and the rear section 2 is equipped with handles of conventional construction.

Pivotally secured upon the underside of the beam by means of a bolt 7 is the harrow bar 8 which is provided with a longitudinal slot 9.

The harrow bars 8 are of circular cross section; and mounted upon said bars are the cuffs or holders 10 which include sleeves 11 fitted upon the bars and having downwardly extending shanks 12. The sleeves 11 are provided with set screws 13, whereby they may be secured upon the harrow bars, and said sleeves are provided in their front and rear sides with vertical slots 14 for the passage of bolts 15 which extend through the longitudinal slots 9 of the harrow bars. These bolts are provided with curved washer plates 16 exteriorly engaging the sleeves 11, the opposing faces of said sleeves and washer plates being provided with intermeshing or interlocking serrations 17, 18 which, when the nuts 26 are tightened upon the bolts 15, will positively secure the sleeves against rotation upon the harrow bars. The shanks 12 of the cuffs or holders 10 are provided with eye bolts 19 for the purpose of securing in position the feet 20 which are shaped at one end to form harrow teeth 21 of conventional construction, while the opposite ends of said feet are provided with slots 30 for the passage of fastening members whereby cultivator blades of any desired shape may be secured upon the feet. The latter, it will be understood, may be readily adjusted vertically or reversed end for end, as occasion may demand.

For the purpose of better assembling and securing the parts it is preferred to employ tubular collars 22, the same being fitted upon the eye bolts 19 between the shanks 12 and the feet 20, and said collars being provided with recesses 23 affording seats for the feet. The inner ends of the collars 22 are preferably rounded and seated in recesses 24 in the front sides of the shanks 12, as will be best seen in Fig. 2 of the drawings.

From the foregoing description taken in connection with the drawings hereto annexed, the operation and advantages of this invention will be readily understood by those skilled in the art to which it appertains. The bars 8 carrying the earth engaging implements may be adjusted at various angles, and the cuffs or holders carrying said implements may likewise be adjusted at various angles upon said bars, thus causing the teeth or blades to engage the soil at the required depth.

The construction is simple and inexpensive, and the device is thoroughly efficient for the purposes for which it is provided.

I claim:

1. In an implement of the class described, a horizontally slotted supporting bar in combination with a tool holder comprising a sleeve having vertical slots in its front and rear sides, and a downwardly extending tool carrying shank, a fastening bolt extending through the slots in the sleeve and in the bar, a set screw extending through the sleeve and engaging the bar, and a clamping washer upon the bolt, said washer and sleeve being provided with opposed serrated faces.

2. In an implement of the class described, a tool carrying holder comprising a sleeve having a downwardly extending shank provided with a recess forming a seat, a tool supporting eye bolt extending through the shank, and a notched collar fitted upon the eye bolt and engaging the seat in the shank.

In testimony whereof I affix my signature in presence of two witnesses.

SAMUEL T. SHERRILL.

Witnesses:
    THOS. J. GIBSON,
    B. F. SHERRILL.